Nov. 19, 1968
R. W. HECKER, JR
3,411,168
DOCKBOARD
Filed June 20, 1966
4 Sheets-Sheet 4
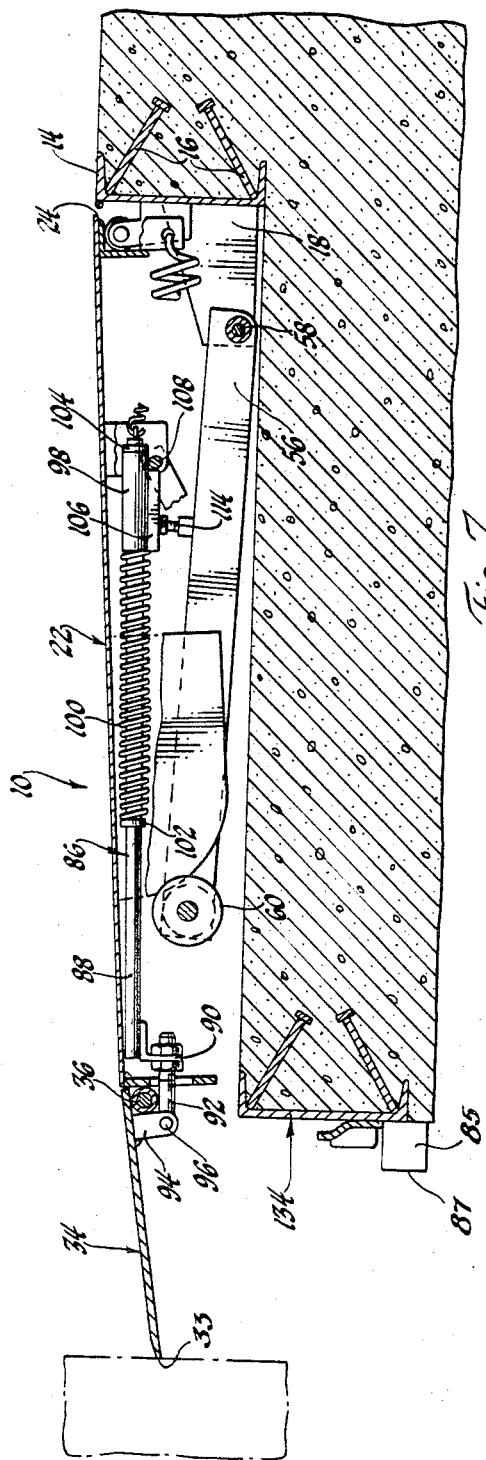
INVENTOR.
Robert W. Hecker, Jr.
BY
Barnard, McGlynn & Reising
ATTORNEYS United States Patent Office 3,411,168
Patented Nov. 19, 1968

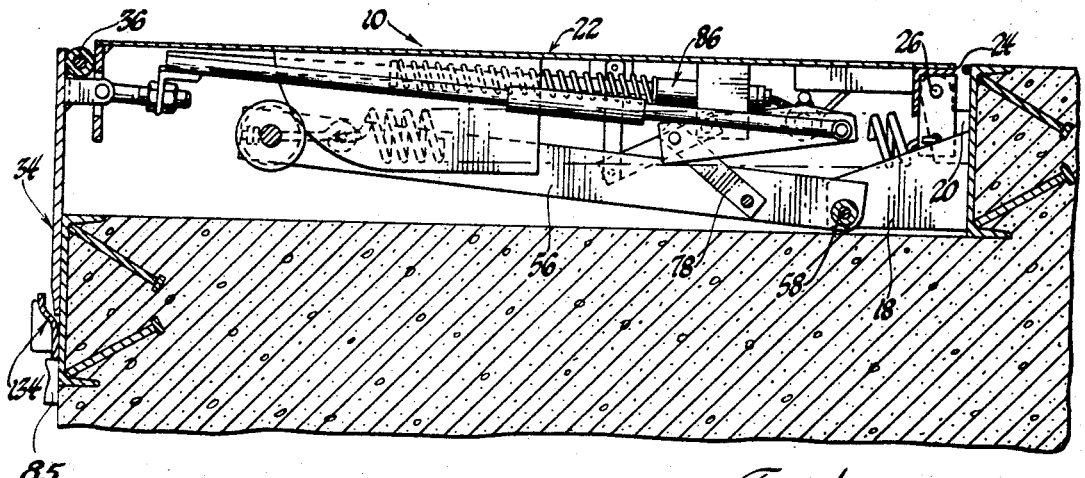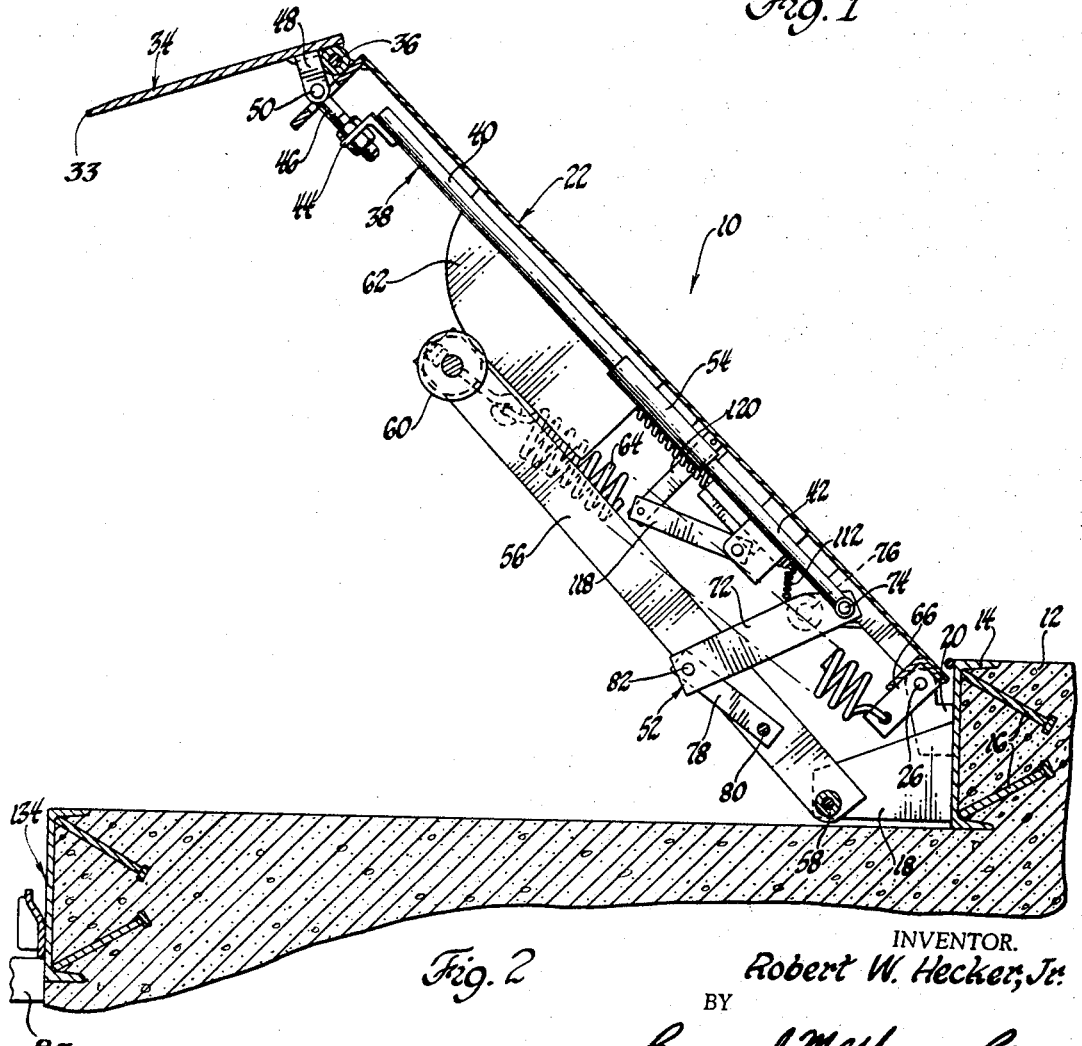

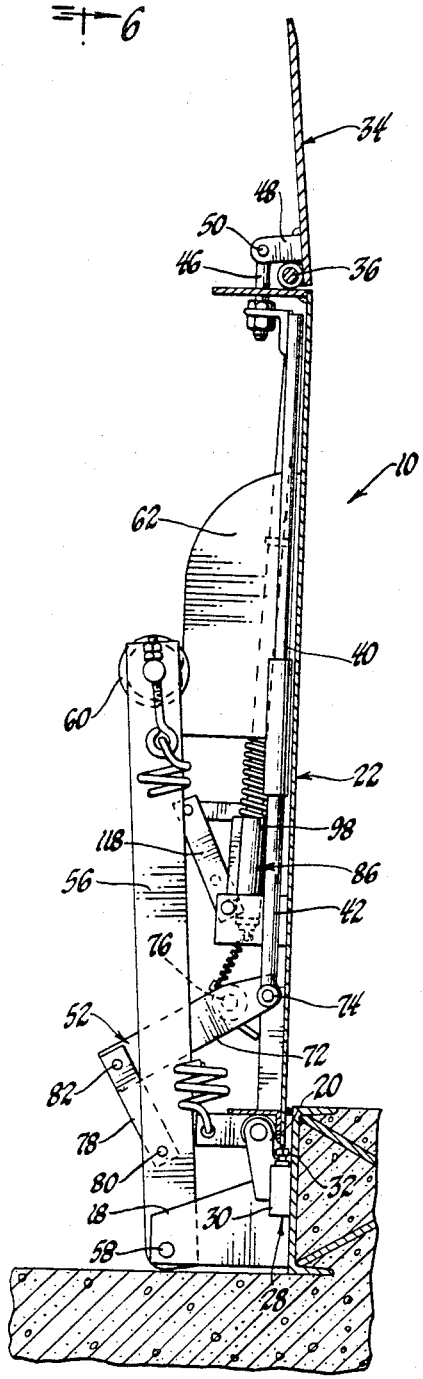
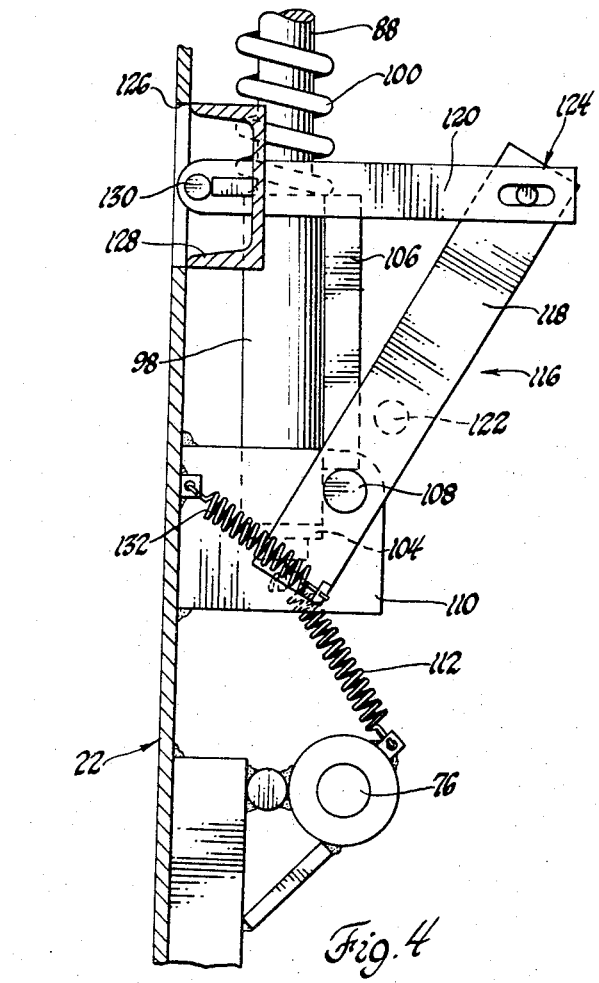
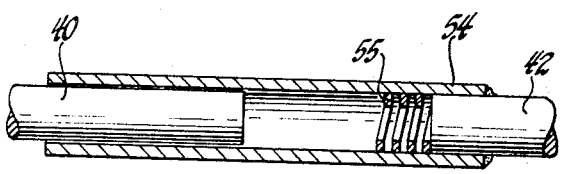

3,411,168
DOCKBOARD
Robert W. Hecker, Jr., Clare, Mich., assignor to Loomis Machine Company, Clare, Mich., a corporation of Michigan
Filed June 20, 1966, Ser. No. 558,881
16 Claims. (Cl. 14—71)

ABSTRACT OF THE DISCLOSURE

A dockboard including a support structure with a ramp pivotally connected at a first end thereof to the support structure for pivotal movement upwardly and downwardly between a substantially vertical position and a lower position. A ramp lip is pivotally connected to the second end of the ramp for movement between a pendent position and an extended cantilevered position. There is included actuation means for automatically pivoting the ramp lip from the pendent position to the extended cantilevered position in response to upward pivotal movement of the ramp. More specifically, this actuation means includes components and a lost motion connection therebetween so that said components will function when said ramp reaches said predetermined position to begin to pivot said ramp lip to the extended cantilevered position whereby the lip will not contact a vehicle immediately adjacent the dock when the ramp first begins to move upwardly because of the delayed movement of the lip from the pendent to the extended cantilevered position.

---

The instant invention relates to a vertical dockboard of the type supported on a dock and movable to a position resting on the bed of a truck adjacent the dock for facilitating traffic between the dock and the truck.

Broadly speaking, prior dockboards are classified by those skilled in the art as either a pit installed dockboard or a vertical dockboard. Generally, pit installed dockboards include a ramp pivotally connected to the dock for pivotal movement upwardly from a dock level position where the ramps are stored when not in use. These pit installed dockboards utilize various mechanisms to lift or pivot the ramp upwardly from the dock level position and frequently include a ramp lip pivotally connected to the ramp and a mechanism to pivot the ramp lip from a pendent position to an extended cantilevered position. These mechanisms in pit installed dockboards, however, do not allow the ramp to be pivoted to the vertical position. Therefore, the rear doors of a truck must be opened before the truck is positioned adjacent the dock because, once the truck is positioned adjacent the dock for loading or unloading, the doors will engage the ramp since the ramp in such pit installed dockboards cannot be raised to a sufficient height to allow enough clearance for opening the doors.

Thus, the pit installed type dockboards are not suitable for many installations and as an alternative the vertical dockboards are utilized. A vertical dockboard is one which may be pivoted to a substantially vertical position and may be stored in the vertical position when not in use. Also, when in the vertical position, a vertical dockboard will allow sufficient clearance between the edge of the dock and the ramp for opening and closing the doors of a truck which is positioned adjacent the dock for loading or unloading. It is desirable in most installations to utilize a vertical dockboard which includes a ramp pivotally connected to the dock with a ramp lip pivotally connected to the forward end of the ramp. Such a ramp lip may be moved to an extended cantilevered position to form an extension of the ramp whereby the ramp lip may be positioned on the bed of a truck or the like. However, in heretofore known vertical dockboards, which include a ramp lip pivotally connected to the ramp, the ramp lip must be pivoted from a pendent inactive position to the extended cantilevered position independently of movement of the ramp, thus requiring separate operation to extend the ramp lip. In many known vertical dockboards, the ramp lip must be manually pivoted from the inactive pendent position to the extended cantilevered position and as a separate operation, the ramp is pivoted to the desired position for loading or unloading a truck.

Accordingly, it is an object and feature of this invention to provide a vertical dockboard having a ramp pivotally connected to a dock for pivotal movement to and from a vertical position with a ramp lip pivotally connected to the ramp for movement between a pendent position and an extended cantilevered position and including actuation means for automatically pivoting the ramp lip from the pendent position to the extended cantilevered position in response to upward pivotal movement of the ramp.

Another object and feature of this invention is to provide a vertical dockboard including a ramp and a ramp lip pivotally connected to the ramp and which may be stored in either a vertical position with the ramp lip in the extended cantilevered position or in a dock level position with the ramp lip in the pendent position.

A further object and feature of this invention is to provide a vertical dockboard including a ramp supported for pivotal movement between a dock level position and a substantially vertical position with a ramp lip connected to the ramp for pivotal movement between a pendent position and an extended cantilevered position and actuation means responsive to movement of the ramp only after the ramp has reached a predetermined position above the dock level position to automatically pivot the ramp lip from the pendent position to the extended cantilevered position.

These and other objects and features of this invention may be attained by a preferred embodiment of the dockboard of the instant invention which includes a ramp pivotally connected at one end to a support structure with a ramp lip pivotally supported at the other end of the ramp. The ramp lip is movable between a pendent position and an extended cantilevered position to form an extension of the ramp. The dockboard includes a lift arm pivotally connected at one end to the support structure with a cam follower at the other end to engage a cam depending from the ramp and biasing means interconnecting the lift arm and the support structure to urge the lift arm to pivot upwardly. An actuation means is included and comprises a pair of telescoping links cooperable with the ramp lip and the lift arm in such a manner that the ramp lip is automatically pivoted from the pendent position toward the extended cantilevered position in response to pivotal movement of the ramp once the ramp has been pivoted upwardly to a predetermined position above dock level, thus preventing interference between the ramp lip and the truck positioned adjacent the dock. The dockboard also includes a latching means comprising a rod operatively attached at one end to the ramp lip and having a locking pad slidable thereon at the other end with a recess in the locking pad engageable with a pin depending from the ramp for locking or latching the ramp lip in the extended cantilevered position. In addition, the dockboard includes a stop means for engaging the ramp to support the ramp in the vertical position as the ramp lip is latched in the extended cantilevered position.

Other objects and attendant advantages of this invention will be readily appreciated as the same becomes better understood by reference to the following detailed description when considered in connection with the accompanying drawings wherein:

FIGURE 1 is a cross-sectional view through the dockboard in the dock level position;

FIGURE 2 is a cross-sectional view of the dockboard being raised toward the vertical position;

FIGURE 3 is a cross-sectional view through the dockboard in the vertical position;

FIGURE 4 is a fragmentary enlarged cross-sectional view taken substantially along line 4—4 of FIGURE 6;

FIGURE 5 is an enlarged fragmentary cross-sectional view taken substantially along line 5—5 of FIGURE 6;

FIGURE 7 is a cross-sectional view of the dockboard with the ramp lip in the extended position; and FIGURE 8 is a cross-sectional view of the dockboard with the ramp lip being forced toward the pendent position.

Referring now to the drawings, wherein like numerals indicate like or corresponding parts throughout the several views, a dockboard constructed in accordance with the instant invention is generally shown at 10.

Figure 6:
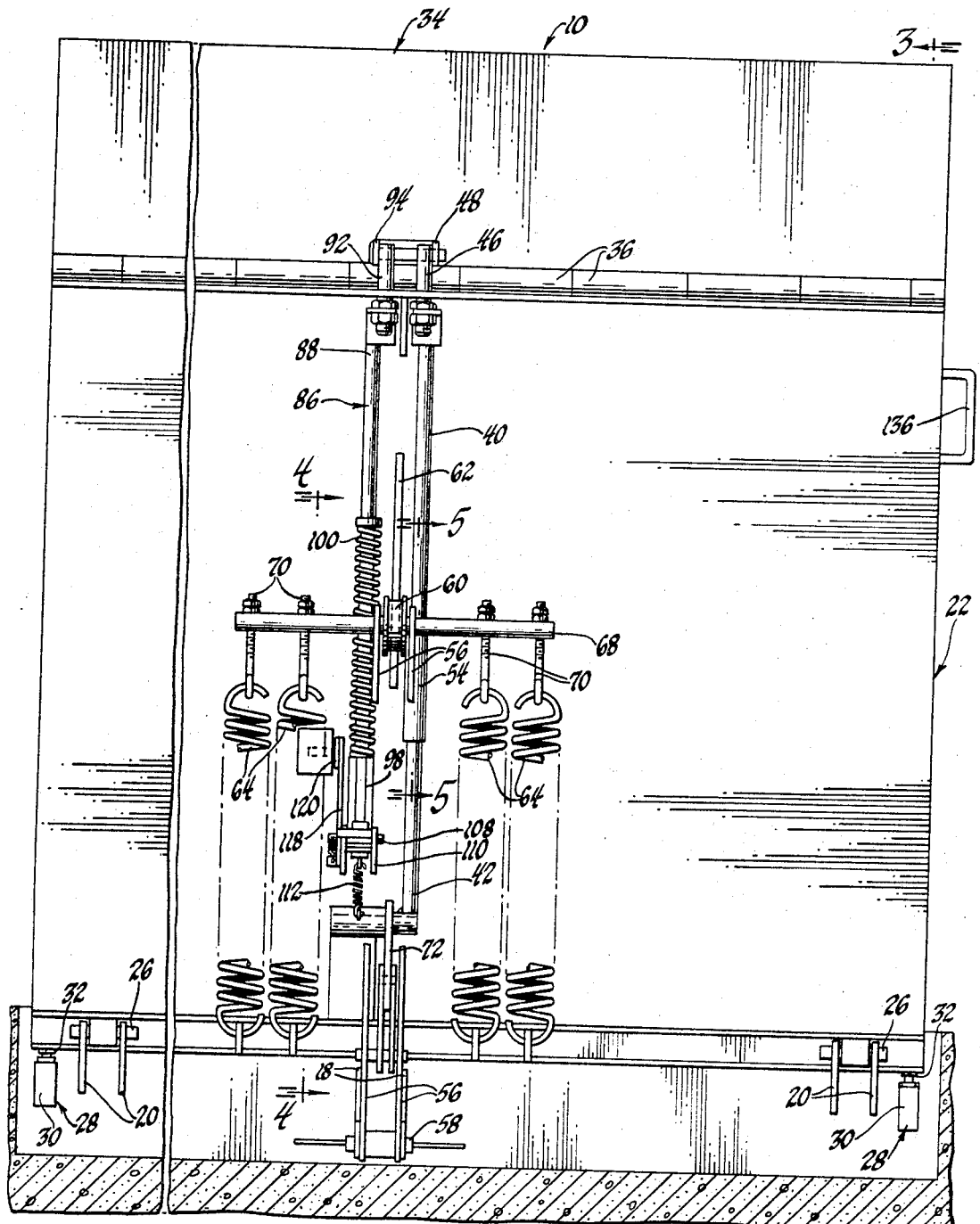
FIGURE 6 is a view partially broken away and taken substantially along line 6—6 of FIGURE 3.

The dockboard is associated with a dock 12 by a support structure 14. The dock is preferably and usually made of cement with the support structure 14 being structural steel secured to the dock by the embedded member 16. The support structure 14 includes the outwardly extending members 18 and 20. It will be understood, of course, that the support structure may form an integral part of the dock.

The dockboard includes a ramp, generally indicated at 22. The ramp is pivotally connected to the support structure by the pin 26 in spaced relation to a first end 24 for pivotal movement from the below dock level position illustrated in FIGURE 7, to the dock level position illustrated in FIGURE 1, through an intermediate position to the substantially vertical position illustrated in FIGURES 3 and 6, and vice versa.

There is included stop means, generally indicated at 28 in FIGURES 3 and 6, for supporting the ramp in the vertical position. The stop means 28 includes a plurality of female threaded members 30 which are secured to the support structure 14 and a plurality of bolts 32 threadedly engaging the female threaded members 30 whereby the vertical heights may be adjusted and for engaging the end 24 of the ramp 22 to support the ramp 22 in the vertical position.

There is also included a ramp lip, generally indicated at 34, which is pivotally connected to the second end of the ramp 22 for movement between the pendent position illustrated in FIGURE 1 and the extended cantilevered position illustrated in FIGURES 3, 6 and 7. The ramp lip 34 is connected to the ramp 22 by the piano-type hinge 36 and the ramp lip 34 is moved from the pendent position to the extended cantilevered position by the actuation means, generally indicated at 38. The actuation means 38 includes lost motion means comprising a pair of links 40 and 42. The first link 40 is operatively connected to the ramp lip 34 by way of the angular member 44, the stud 46, and the depending leg 48. The leg 48 depends from the ramp lip 34 and is pivotally connected to the stud 46 by the pin 50. The links 40 and 42 coact in a telescoping relationship by way of the tubular member 54 which is secured to the link 42 and slidably receives the link 40. The spring 55 cushions the contact between the links 40 and 42. As will be more fully described hereinafter, means, generally indicated at 52, is operatively connected to the second link 42 for moving the second link 42 during pivotal movement of the ramp 22.

A lift arm 56 comprising two parallel elements is pivotally connected to the support structure at a first end by way of the pin 58 and operatively engages the ramp 22 by way of the cam follower 60 rotatably disposed on the other end. The ramp 22 has a cam 62 depending therefrom which operatively coacts with the cam follower 60. Biasing means including the springs 64 interconnect the lift arm 56 and the depending portion 66 of the ramp 22 which is disposed adjacent the pivotal connection 26 of the ramp to the support structure 14. Thus, the arm 56, cam follower 60, cam 62, and springs 64 comprise a lift means for urging the ramp to pivot upwardly. Of course, it will be understood that the springs 64 may also be directly attached to the support structure instead of to the depending portion 66 of the ramp 22. More specifically, a bar 68 extends laterally from each side of the lift arm 56 and the springs 64 are attached thereto by way of the eye bolts 70. Preferably, the springs 64 are positioned relative to the lift arm 56 to apply an upward moment to the ramp 22 through the cam 62 so that the ramp 22 will pivot downwardly under its own weight when positioned below an intermediate position but pivot upwardly toward the vertical position as a result of the moment applied by the springs 64 when the ramp is above the intermediate position. In other words, the relationship between the lift arm 56, the springs 64 and the ramp is such that at an intermediate position of the ramp, the weight of the ramp equals the moment applied by the springs but above the intermediate position the moment is sufficient to pivot the ramp upwardly and below the intermediate position the moment is not sufficient to overcome the weight of the ramp and the ramp pivots downwardly.

The means 52 for moving the second link 42 includes a lever 72 which is connected at 74 adjacent a first end to the second link 42. The lever 72 is also pivotally connected to the ramp 22 at 76. A member 78 is pivotally connected to the lift arm 56 at 80 adjacent one end thereof and is pivotally connected at 82 to the second end of the lever 72 adjacent the other end thereof. Thus, the member 78 pivots the lever 72 about the pivotal connection 76 to move the second link 42 as the lift arm 56 and the ramp 22 pivot relative to the support structure 14, as best illustrated by comparing FIGURES 2 and 3. It is significant to note that the lever 72 begins to rotate about its pivotal connection to the ramp at 76 when the ramp 22 is initially pivoted upwardly from the dock level position illustrated in FIGURE 1. However, due to the telescoping connection between the links 40 and 42, the link 42 does not begin to move the link 40 until the ramp 22 has reached a predetermined position above the dock level position, preferably 45° with the horizontal, as it moves toward the vertical position. The predetermined position above the dock level position where the ramp lip 34 begins to pivot upwardly from the pendent position as the ramp 22 is pivoted upwardly is a function of the position of the bumper means 85 which are disposed on the loading dock for engaging a vehicle. The bumper means 85 are of the well-known type which are frequently utilized with such loading docks for engaging the rear of a truck or a similar vehicle. The forward surface 87 of the bumper means 85 is the vehicle-engaging portion of the bumper means and a vehicle such as a truck may be backed toward the loading dock so as to engage the surface 87 of the bumper means 85. A portion of a vehicle may engage the surface 87 of the bumper means 85, yet the vehicle may have other projections such as handles on the doors, or the like, which extend rearwardly of the engagement between the surface or portion 87 of the bumper means 85 and the vehicle. Hence, the actuation means 38 is adapted to pivot the ramp lip 34 as the ramp 22 pivots upwardly from the dock level position to maintain all portions of the ramp lip, and particularly the tip 33, spaced a predetermined distance rearwardly of the vertical plane passing through the vehicle-engaging portion 87 of the bumper means 85 so that a vehicle may be positioned in contact with the bumper means 85 and the ramp may be pivoted upwardly to extend the ramp lip 34 without the ramp lip 34 engaging any portion of the vehicle as it pivots from the pendent position to the extended cantilevered position. The telescoping links 40 and 42 and the position and thickness of the bumper means 85, therefore, determine how far rearwardly of the vertical plane containing the vehicle-engaging portion 87 of the bumper means 85 the tip 33 of the ramp lip 34 is maintained while the ramp lip 34 is moved from the pendent position to the extended cantilevered position. Preferably, the vehicle-engaging portion 87 of the bumper means 85 is positioned approximately four inches forwardly of the loading dock and the links 40 and 42 are adapted to coact with one another so that the tip 33 of the ramp lip 34 never extends more than three inches forward of the loading dock as the ramp lip 34 is being pivoted from the pendent position to the extended cantilevered position.

There is also included a latch means, generally indicated at 86, for yieldably supporting the ramp lip 34 in the extended cantilevered position. The latch means includes a rod 88 which is operatively connected to the ramp lip 34 through the angled member 90, the stud 92, and the depending leg 94. The depending leg 94 is secured to the ramp lip 34 and is pivotally connected at 96 to the stud 92. The depending legs 48 and 94 are actually legs of an integral U-shaped member welded to the bottom of the ramp lip 34, as is best illustrated in FIGURE 6. A locking pad 98 is slidably disposed on the rod 88 adjacent the second end of the rod and a biasing means comprising the spring 100 urges the locking pad 98 toward the second end of the rod 88. The spring 100 reacts between the washer-like member 102 secured to the rod 88 and the locking pad 98. Another washer-like member 104 is secured to the second end of the rod 88 to retain the locking pad 98 on the rod 88. The locking pad 98 has a member 106 welded to or integral with the bottom thereof to form a recess which drops into latching engagement with the abutment formed by the pin 108. The pin 108 slidably supports the locking pad 98 and coacts with the recess to yieldably support the ramp lip 34 in the extended cantilevered position. That is, when the locking pad 98 is latched with the pin 108 as in FIGURE 7, the ramp lip 34 may be moved from the cantilevered position toward the pendent position by compressing the spring 100 as illustrated in FIGURE 8. Such movement of the ramp lip 34 may occur when the ramp lip 34 is yieldably supported in the extended cantilevered position and a truck, or the like, backs into and engages the ramp lip 34 to force the ramp lip 34 toward the pendent position. Once the truck has moved away from the ramp lip 34, the ramp lip 34 returns to the extended cantilevered position under the action of the spring 100. The pin 108 is supported between a pair of flanges 110 and a spring 112 interconnects the ramp 22 and the rod 88 for urging the locking pad 98 into sliding and latching engagement with the pin 108.

There is also included means for moving the locking pad to allow the locking pad to slide along the pin 108 and includes the adjustable projection 114 which extends from the lift arm 56. The adjustable projection 114 engages the locking pad 98 to move the locking pad 98 upwardly when the ramp 22 is pivoted to a predetermined position below dock level, as illustrated in FIGURE 8, to allow the ramp lip 34 to pivot to the pendent position as the locking pad 98 slides along the pin 108 while confined between the flanges 110. Thus, when the ramp lip 34 is latched in the extended cantilevered position, the ramp 22 may be pivoted to a position below dock level, as illustrated in FIGURE 8, to automatically unlatch the ramp lip 34.

As best illustrated in FIGURE 4, there is also included a manual unlatching means, generally shown at 116, for moving the locking pad 98 relative to the pin 108 for unlatching the ramp lip 34 to allow the ramp lip 34 to pivot to the pendent position. The manual unlatching means 116 includes a latch link 118 and a handle 120. The latch link 118 is pivotally connected adjacent a first end to one of the flanges 110 by way of the pin 108 and includes means comprising the pin 122 projecting therefrom for engaging the locking pad 98 to allow the locking pad 98 to slide along the pin 108 between the flanges 110. The handle 120 is connected through the lost motion connection, generally shown at 124, to the other end of the latch link 118 and extends through an aperture 126 in the ramp 22 so that it may be manually grasped. A recess is formed in the ramp 22 by the cup-shaped member 128 which has a slot for receiving the handle 120, the handle 120 having a crossed member 130. The handle 120 may be manually grasped and pulled upwardly through the ramp 22 to pivot the link 118 so that the pin 122 engages the locking pad 98 to unlatch the ramp lip 34 whereby the ramp lip 34 may pivot to the pendent position. A spring 132 interconnects the ramp 22 and the latch link 118 to urge the latch link out of engagement with the locking pad 98.

A handle 136 is secured to the ramp 22 so that the ramp may be manually pivoted relative to the support structure.

There is also included a support means, generally indicated at 134, for receiving the ramp lip 34 when the ramp lip 34 is in the pendent position to support the ramp 22 in a dock level position as illustrated in FIGURE 1. Thus, the ramp may be inactively positioned in either the vertical position illustrated in FIGURE 3 with the ramp lip 34 latched in the extended cantilevered position or in the dock level position illustrated in FIGURE 1 with the ramp lip 34 in the pendent position and engaged in the support means 134.

Thus, the instant invention provides a dockboard having a ramp pivotally connected to the support structure with the ramp lip pivotally connected to the ramp for pivotal movement between a pendent position and an extended position and including an actuation means for pivoting the ramp lip from the pendent position to the extended cantilevered position as the ramp pivots from a predetermined position above the dock level position toward the vertical position and wherein the ramp may be stored in an inactive vertical position or in an inactive dock level position.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A vertical dockboard for a loading dock comprising; a support structure, a ramp pivotally connected at a first portion thereof to said support structure for pivotal movement upwardly to and downwardly from a substantially vertical position, a ramp lip pivotally connected to a second portion of said ramp for movement between a pendent position and an extended cantilevered position, actuation means for automatically pivoting said ramp lip from said pendent position to said extended cantilevered position in response to upward pivotal movement of said ramp, and said actuation means including components and a lost motion connection therebetween so that said components will function when said ramp reaches a predetermined position to begin to pivot said ramp lip.

2. A vertical dockboard as set forth in claim 1 wherein said ramp is operable for pivotal movement between a dock level position and said subtantially vertical position and including bumper means for engaging a vehicle, said components being sized so that the motion lost in said lost motion connection ends so that said components coact to pivot said ramp lip at said predetermined position as said ramp pivots upwardly from said dock level position to maintain all portions of said ramp lip rearward of a vertical plane passing through the vehicle-engaging portion of said bumper means as said ramp lip pivots from said pendent position to said extended cantilevered position.

3. A dockboard as set forth in claim 1 including support means for receiving said ramp lip when said ramp lip is in said pendent position to support said ramp in a dock level position so that said ramp may be inactively positioned in said substantially vertical position with said ramp lip in said extended cantilevered position or in said dock level position with said ramp lip in said pendent position.

4. A vertical dockboard as set forth in claim 1 wherein said ramp is operable for pivotal movement from a dock level position, through an intermediate position, to said substantially vertical position, and vice versa, and including lift means for urging said ramp to pivot upwardly to said substantially vertical position when said ramp is above said intermediate position and operable to allow said ramp to pivot downwardly when below said intermediate position.

5. A dockboard as set forth in claim 4 including stop means for supporting said ramp in said substantially vertical position.

6. A vertical dockboard as set forth in claim 5 including latch means for yieldably supporting said ramp lip in said extended cantilevered position.

7. A vertical dockboard as set forth in claim 6 wherein said components include a pair of links with a first of said links operatively connected to said ramp lip, and means operatively connected to the second of said links for moving said second links during pivotal movement of said ramp, said links coacting in a telescoping relationship so that said second link moves said first link when said ramp has reached said predetermined position in pivoting toward said vertical position for raising said ramp lip from said pendent position to said extended cantilevered position.

8. A vertical dockboard as set forth in claim 7 wherein said lift means includes a lift arm pivotally connected to said support structure at a first end and operatively engaging said ramp at the second end, biasing means interconnecting said lift arm and one of said support structure and said ramp adjacent the pivotal connection of said ramp to said support structure, said means for moving said second link including a lever connected adjacent a first end thereof to said second link, said lever pivotally connected adjacent said first end thereof to said ramp, and a member pivotally connected to said lift arm and pivotally connected to the second end of said lever so that said member pivots said lever about the pivotal connection thereof to said ramp to move said second link as said lift arm and said ramp pivot relative to said support structure.

9. A vertical dockboard as set forth in claim 8 including a cam projecting from said ramp and a cam follower disposed on said second end of said lift arm for engaging said cam.

10. A vertical dockboard as set forth in claim 8 wherein said latch means includes a rod operatively attached to said ramp lip adjacent a first end thereof and a locking pad slidably disposed thereon adjacent the second end thereof, second biasing means urging said locking pad toward said second end of said rod, said locking pad having a recess therein, said ramp including an abutment for slidably supporting said locking pad and for coacting with said recess therein to yieldably support said ramp lip in said extended cantilevered position.

11. A vertical dockboard as set forth in claim 8 wherein said ramp is operable for pivotal movement to a below dock level position and including means for moving said locking pad relative to said abutment to allow said locking pad to slide along said abutment for unlatching said ramp lip when said ramp reaches said below dock level position thereby to allow said ramp lip to pivot to said pendent position.

12. A vertical dockboard as set forth in claim 11 wherein said abutment is a pin supported between a pair of flanges extending downward from said ramp, and said means for moving said locking pad comprises an adjustable projection extending from said lift arm.

13. A dockboard as set forth in claim 10 including manual unlatching means for moving said locking pad relative to said abutment for unlatching said ramp lip to allow said ramp lip to pivot to said pendent position.

14. A dockboard as set forth in claim 13 wherein said abutment is a pin supported between a pair of flanges extending downward from said ramp, said manual unlatching means comprises a latch link pivotally connected to one of said flanges adjacent a first end thereof and including means for engaging said locking pad, and a handle connected through a lost motion connection to the second end of said latch link and extending through said ramp for manual grasping thereof to move said latch link to move said locking pad relative to said pin to unlatch said ramp lip whereby said ramp lip may pivot to said pendent position.

15. A dockboard as set forth in claim 14 including first spring means interconnecting said ramp and said latch link to urge said latch link out of engagement with said locking pad.

16. A dockboard as set forth in claim 15 including second spring means interconnecting said ramp and said second end of said rod for urging said locking pad into engagement with said pin.

References Cited

UNITED STATES PATENTS

| | | | |
|---|---|---|---|
| 3,323,158 | 6/1967 | Loomis | 14—71 |
| 3,327,335 | 6/1967 | Beckwith et al. | 14—71 |
| 3,235,896 | 2/1966 | Riggs | 14—71 |

JACOB L. NACKENOFF, *Primary Examiner.*